A. H. NEULAND.
DYNAMO-ELECTRIC MACHINE.
APPLICATION FILED JAN. 23, 1918. RENEWED NOV. 16, 1921.

1,418,390.

Patented June 6, 1922.
2 SHEETS—SHEET 1.

INVENTOR
Alfons H. Neuland
BY
Rosenbaum, Stockbridge & Borst
ATTORNEYS

A. H. NEULAND.
DYNAMO-ELECTRIC MACHINE.
APPLICATION FILED JAN. 23, 1918. RENEWED NOV. 16, 1921.

1,418,390.

Patented June 6, 1922.
2 SHEETS—SHEET 2.

INVENTOR
Alfons N. Neuland
BY
Rosenbaum, Stockbridge & Borst
ATTORNEYS

UNITED STATES PATENT OFFICE.

ALFONS H. NEULAND, OF GLENDALE, CALIFORNIA, ASSIGNOR TO NEULAND ELECTRICAL COMPANY, INC., OF SAN FRANCISCO, CALIFORNIA, A CORPORATION OF NEW YORK.

DYNAMO-ELECTRIC MACHINE.

1,418,390. Specification of Letters Patent. Patented June 6, 1922.

Application filed January 23, 1918, Serial No. 213,306. Renewed November 16, 1921. Serial No. 515,693.

*To all whom it may concern:*

Be it known that I, ALFONS H. NEULAND, a citizen of the Provisional Government of Russia, residing at Glendale, in the county of Los Angeles and State of California, have invented certain new and useful Improvements in Dynamo-Electric Machines, of which the following is a full, clear, and exact description.

My invention relates to dynamo-electric machines and particularly to transmission devices of the electro-magnetic type, the principle of operation being that patented in my prior Patent No. 1,171,134 of February 8, 1916, and being especially adapted for embodiment as a speed changing device.

One of the objects of my present invention is to adapt the principle employed in my said priorly patented construction to ship propulsion to take the place of the mechanical reduction gears used with turbines, and while this invention is susceptible of various other embodiments, I have adopted such a magnetic gear as the basis of my disclosure and as the illustrated embodiment of my invention.

More particularly, an object of my invention is to provide a magnet or field construction suitable for the high rotative speed of turbines and capable of withstanding the large centrifugal forces developed thereby.

Another object is to provide a construction of the cages constituting the laminated magnetic conductors and the mounting therefor, which combines strength and rigidity with convenience in assembly, and permits the use of laminated bars of relatively large section.

Another object is to provide convenient and reliable means for braking the momentum of the magnet and turbine rotor to enable quick reversal.

Another object is to provide a construction which will prevent unbalancing by sagging or a displacement of the center of rotation of the magnet or field element.

Another object is to provide means for reducing the windage losses to a minimum.

Another object is to provide a construction in which the gear and turbine may be connected as a unit and the propeller thrust be transmitted to the frame of the ship and the turbine be relieved thereof.

Other objects and advantages of my invention will appear from the following description.

In accordance with my invention, the cages are formed of non-magnetic supporting rods or bars, preferably round, between which the suitably shaped laminations are forced, being supported on both sides by the bars. The pole pieces of the rapidly revolving field member are provided at intervals with integral flanges to divide up the copper and relieve the end flange of the strain due to centrifugal force. The winding is so arranged that the centrifugal forces will not displace it and so as to bring all the leads to the outside for convenience in connection, and suitable retaining means are provided around the winding to hold it in place.

The braking means comprise a suitable secondary winding on the stationary member which is open during normal running conditions, but which includes means for being normally closed through a variable resistance when it is desired to quickly bring the field to rest.

The sagging or relative displacement of the field member is prevented by so arranging and constructing the parts that the field member is partly supported by and surrounds the driven shaft. Also in accordance with my invention, the magnetic gear, while attached to the turbine, is externally supported upon the frame work of the ship, and includes a thrust bearing for taking the thrust of the propeller which is thereby transmitted to the beams of the ship. The field member is provided with a special non-magnetic covering to minimize the air resistance.

My invention also comprehends various other features of construction and arrangements and combinations of parts as will hereinafter more fully appear.

I shall now describe the illustrated embodiment of my invention and shall thereafter point out my invention in claims.

Figure 1:
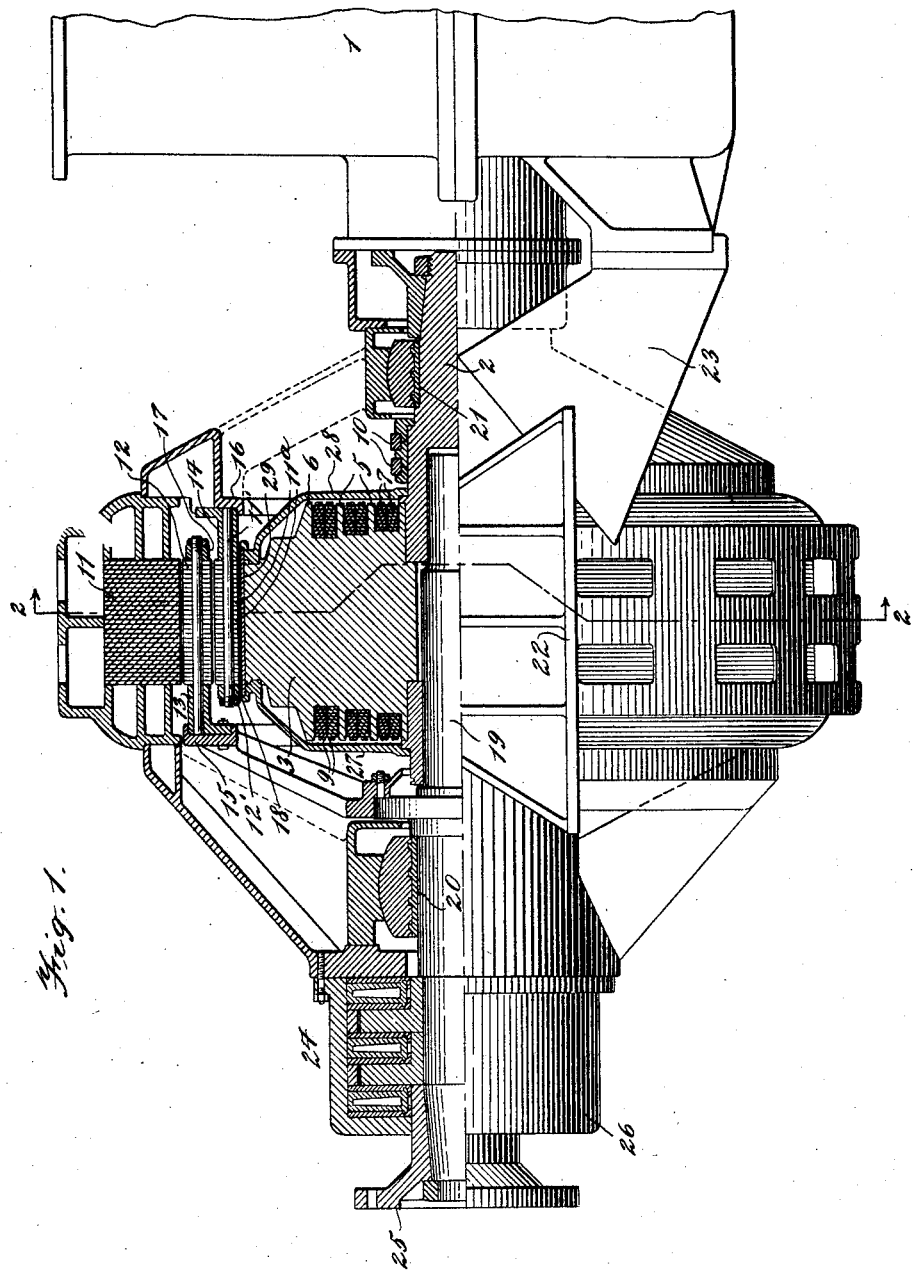
Figure 1 is a longitudinal view, partially in elevation and partially in section, of a magnetic gear embodying my invention, with the adjacent portion of the turbine in elevation.

The three elements of the magnetic gear are the primary or driving member, consisting of the internal field member or magnet which is connected to and driven by the turbine, the external stationary member constituting the stator, and a series of laminated bars comprising the intermediate secondary or driven member which is connected to the driven or main shaft.

The field member is shown as bi-polar and is connected to the rotor of the turbine 1 through the stub shaft 2. Pole pieces 3 and 4 of the field member are provided with circumferential grooves forming integral intermediate flanges 5 in addition to the end flanges 6. These intermediate flanges 5 serve to divide up the copper winding 7 into a plurality of divisions separated by the intermediate flanges, and thereby the end flanges 6 are relieved of a cumulative strain due to the considerable centrifugal forces developed by the high rotation of the field member. These grooves are preferably progressively deeper from the inner to the outer end of the pole pieces, whereby the strength of the pole pieces on the field member is increased toward the center of the revolving member. The field winding 7 is wound directly into the grooves and comprises a bare strip of copper insulated from the core by insulating plates, and its successive turns are insulated from each other by intermediate strips of insulating material. The winding in each groove consists of two sections, as shown, which are wound in opposite directions in order to bring all of the leads to the outside for easy connection. These sections are separated by an intermediate insulating plate 8, and the insulating plates are of such thickness as to wedge the strip in the groove under tension. The winding is further secured in the groove by retaining bands 9 of bronze wire, and the considerable centrifugal forces are unable to displace the winding when so secured and thus cause unbalancing. The field winding is connected to the slip rings 10.

The stator is built up of coarsely toothed laminations 11 which surround the field member, and the cage of the secondary or driven member is interposed between the stator and field member and comprises a circular series of spaced magnetic conductors 12. An additional stationary cage is also inserted between the secondary or driven member and the field member, and comprises a plurality of spaced magnetic conductors 11$^a$ corresponding in number and arranged in radial alignment with the teeth on the stator. This additional stationary cage increases the torque on the driven member by reason of the fact that a torque is thereby produced upon the inner circumference of the driven member as well as upon the outer circumference, and the torque is thereby practically doubled without increasing the core length, the field ampere turns being increased to supply the necessary force for the added gap. The number of magnetic bars of the rotor in the illustrated construction exceeds that of the stator by two, there being sixty-six rotor bars and sixty-four stator bars. Consequently, there are as many points of alignment of the stationary and rotor bars as there are poles of the field member. When the field poles are magnetized they will assume a position of least magnetic reluctance, that is, they will coincide with the aligned bars. Thereafter the field cannot be moved without a movement of the secondary member to maintain the position of least magnetic reluctance; and the angular velocity of the secondary member will depend upon the reduction ratio, which, in the illustrated construction is 33:1. It will be understood that if the number of rotor bars exceeds that of the stator teeth, the rotor will rotate with the field member, while it will rotate against the field member if the number of its bars is less than that of the stator teeth.

The torque on the secondary member is not exerted by the primary, as in a magnetic slipping clutch, but is obtained by the pull of the stator teeth on the secondary bars, the primary or field member furnishing the magnetic force and flux. Before a torque is produced on the secondary member, the primary member must advance somewhat beyond the bar alignment, that is, under the teeth and bars which are only partly aligned and therefore afford a path of greater reluctance. In this position, a torque reaction exists between the field poles and the bars at the point of maximum alignment. The greater the load upon the secondary, the larger also the angle of advance of the primary member beyond the point of alignment, and consequently the greater the primary torque reaction.

The cages are so constructed as to make possible the use of laminated bars of relatively large cross section, and at the same time afford a structure of great strength and rigidity. The laminations 11$^a$ and 12 are supported between non-magnetic rods 11' and 12', respectively, of round cross section. The supporting rods 12' are carried by a non-magnetic ring 13 which has axial holes into which the rods are pressed. Similarly the rods 11' are carried by a non-magnetic ring 14. The non-magnetic ring 13 is attached to the annulus 15 of the spider of the secondary or driven member, and the non-magnetic ring 14 is attached to the annulus 16 of the stationary end bracket of the stator. The laminated bars are forced between the adjacent supporting rods and are insulated therefrom by a fiber tube. Narrow non-magnetic rings 17 and 18, insulated from the rods, tie the cages on the outer side and thus make the structures thoroughly rigid. The position of the laminated bars on the rods is determined by the non-magnetic rings at opposite ends.

In the operation of the device there is developed a tendency of the magnetic conductors to twist upon their axes. This is particularly true of the inner series of conductors 11ª, which are acted upon with greater force on their outer side. This twisting tendency of each magnetic conductor is, however, neutralized or opposed by that of the next adjacent conductors, since each supporting rod is subjected to an inward strain by the magnetic conductor on one side and to an outward strain by the magnetic conductor on its other side, with the result that, even at heavy loads there is substantially no tendency of the supporting bars to warp or bend.

The spider of the secondary or driven member is attached to a flange on the main or driven shaft 19, and this shaft extends through an axial hole in the field member. The field member therefore is partly supported by and rotates around the main or driven shaft on bearings provided at both ends of the field member, as shown.

The two main bearings 20 and 21, one at the end of the main shaft 19 and the other on the stub shaft 2 of the field member, support the weight of the primary and secondary members and thereby make the gear unit independent of the turbine and propeller shaft bearings.

The gear is externally supported on the frame of the ship by lateral brackets or legs 22, which rest upon I-beams of the ship. For the sake of simplicity and unit system of assembly, the turbine is attached to arms 23 extending from the gear bracket, and the thrust bearing 24 is made a part of the gear. An extension of the main or driven shaft 19 carries the thrust flange 25, while the thrust collars are supported in the housing 26. The thrust of the propeller shaft is thereby transferred to the bracket or housing of the gear and thence to the legs 22 and to the supporting beams of the ship.

In order to reduce the windage losses to a minimum, the high velocity field member is entirely enclosed by a smooth casing of aluminum or other non-magnetic material. This casing includes the side plates 27 and 28 and the thin circumferential strip 29, which smoothly joins the side strips, with the result that the casing resembles a smooth drum and offers a minimum of resistance to rapid rotation.

Figure 2:
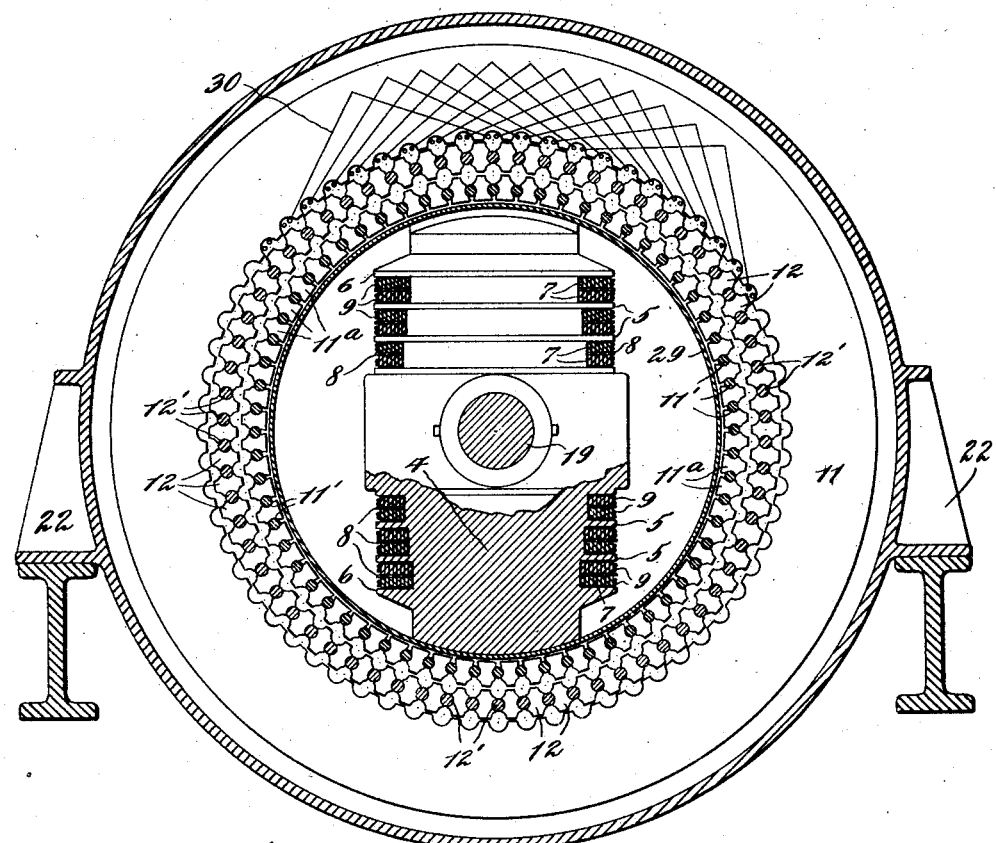
Figure 2 is a central transverse section of the same.
Figure 3:
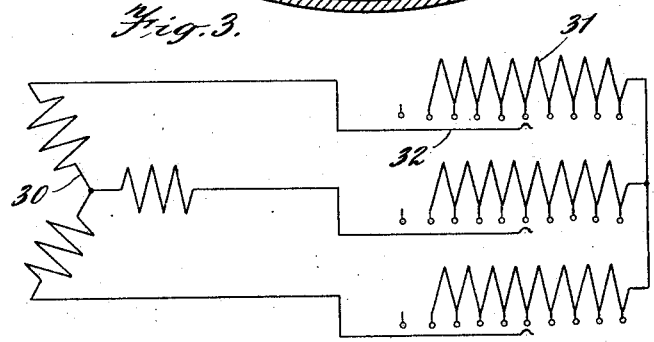
Figure 3 is a diagram of the circuit of the braking winding.

The secondary winding on the stator for braking the momentum of the field member and turbine rotor consists, in the form shown, of a polyphase winding 30 as represented in diagram in Figure 3, a portion only of the winding being indicated in Figure 2. This is manually closed through a variable resistance 31. In normal running conditions the circuit is open, and when the motive fluid is turned off the turbine and the switch 32 closed, the stored energy in the field and turbine rotor is converted into electrical energy and dissipated in the resistance, thereby rapidly checking the momentum of the rotating parts and enabling them to be quickly reversed.

It is obvious that various modifications may be made in the construction shown in the drawings and above particularly described within the principle and scope of my invention.

I claim:

1. In a dynamo-electric machine, in combination with a rotative field member and a stationary member to complete the flux path, a secondary rotatable magnetic member interposed between the field and stationary members and comprising a plurality of spaced longitudinally extending supporting rods, and a plurality of magnetic conductors arranged in the successive spaces between the rods, each magnetic conductor being supported on opposite sides by two adjacent supporting rods.

2. A dynamo-electric machine as described in claim 1 in which the supporting rods of the secondary magnetic member are composed of non-magnetic material and in which the magnetic conductors are transversely laminated.

3. A dynamo-electric machine as described in claim 1 in which the secondary magnetic member is annular and rotatable and in which the supporting rods are circularly arranged and extend parallel to the axis of rotation.

4. An electro-magnetic gearing comprising a rotative field member, a stationary member to complete the flux path, a secondary magnetic member as described in claim 3, in which the circular series of non-magnetic supporting rods is carried by a ring at one end and tied by another ring at the other end and thereby forming a cage, and a spider attached to one side of the cage.

5. The combination in a dynamo-electric machine with a secondary magnetic member and a stationary member to complete the flux path, of a rotative field member comprising a core, the pole pieces of which are provided with circumferential separating flanges forming grooves for the field winding.

6. The combination in a dynamo-electric machine described in claim 5, in which the diameter of the core of the rotative field member increases progressively from the outer to the inner end of the pole pieces.

7. The combination in a dynamo-electric machine described in claim 5, in which there is provided in each groove of the rotative field member a winding of strip copper arranged in two sections wound in opposite directions.

8. The combination in a dynamo-electric machine described in claim 7, in which the successive turns of the strip on the field member are separated by a strip of insulating material, and the two sections are separated by an insulating plate serving to wedge the sections tightly in the groove.

9. The combination in a dynamo-electric machine described in claim 8, in which a band of non-magnetic wire surrounds the winding in each groove in the field member.

10. An electro-magnetic gearing comprising a secondary rotatable member co-operative with a primary rotatable magnet and a stationary member to complete the flux path at a plurality of points corresponding to the number of poles of the magnet, a normally open winding on the stationary member, and means for closing the winding to brake the momentum of the magnet.

11. An electro-magnetic gearing as described in claim 10 in which the normally open winding on the stationary member is arranged to be closed through a variable resistance to brake the momentum of the magnet.

12. In combination with a turbine, an electro-magnetic power transmission device comprising a rotatable magnet connected to and driven by the turbine, a stationary member having a plurality of spaced magnetic conductors, a driven rotatable member having a plurality of magnetic conductors adapted to successively align with those of the stationary member and complete a rotative flux path as the driven member rotates, a normally open winding on the stationary member, and means for closing the winding through a resistance to brake the momentum of the magnet and turbine.

13. An electro-magnetic gearing comprising, in combination with a driving or primary shaft and a driven or secondary shaft, a primary magnet on the primary shaft and a secondary magnetic member on the secondary shaft magnetically related to and rotatively impelled by the magnet, the magnet including a non-magnetic enclosure shaped to reduce the air resistance.

14. An electro-magnetic power transmission device as described in claim 13, in which the enclosure for the magnet comprises two non-magnetic side plates and a circumferential non-magnetic plate joining the side plates.

15. The combination of a prime mover, a driven shaft, a power transmission device for transmitting rotation from the prime mover to the driven shaft including an externally supported stationary housing, a thrust member carried by the driven shaft, and a thrust bearing carried by the housing and interposed between the thrust member and the housing.

16. A propelling unit for ships and the like comprising a prime mover, a driven shaft, an electro-magnetic gearing including a primary magnet rotated by the prime mover and a secondary magnetic member fixed to the driven shaft and an externally supported stationary housing supporting the prime mover, a thrust member carried by the driven shaft, and a thrust bearing carried by the housing and interposed between the thrust member and the housing.

In witness whereof, I subscribe my signature.

ALFONS H. NEULAND.